United States Patent
Shaieb et al.

(10) Patent No.: US 12,058,161 B2
(45) Date of Patent: Aug. 6, 2024

(54) VULNERABILITY REMEDIATION COMPLEXITY (VRC) SYSTEM

(71) Applicant: International Business Machines Corporation, Armonk, NY (US)

(72) Inventors: Johnny Al Shaieb, Houston, TX (US); Jason A. Nikolai, Rochester, MN (US); Michael Redford, Wentzville, MO (US); Steven Ocepek, Cuyahoga Falls, OH (US); Jason Bornheimer, Spring, TX (US); Robert Maier, Milliken, CO (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 16/802,644

(22) Filed: Feb. 27, 2020

(65) Prior Publication Data
US 2021/0273968 A1    Sep. 2, 2021

(51) Int. Cl.
*H04L 9/40* (2022.01)
*G06F 8/65* (2018.01)

(52) U.S. Cl.
CPC ......... *H04L 63/1433* (2013.01); *G06F 8/65* (2013.01)

(58) Field of Classification Search
CPC ..... H04L 63/1433; G06F 8/65; G06F 21/577; G06F 8/71; G06F 8/70; G06F 8/658; G06F 8/656
See application file for complete search history.

(56) References Cited

U.S. PATENT DOCUMENTS

| | | | |
|---|---|---|---|
| 6,895,577 B1 | 5/2005 | Noble et al. | |
| 8,627,287 B2 | 1/2014 | Fanning et al. | |
| 8,677,348 B1 | 3/2014 | Ramanathpura et al. | |
| 10,084,809 B1 * | 9/2018 | Rambo | G06F 8/65 |
| 10,735,451 B1 * | 8/2020 | Baker | H04L 63/20 |
| 2006/0130040 A1 | 6/2006 | Subramanian et al. | |

(Continued)

OTHER PUBLICATIONS

Grimes, "8 ways your patch management policy is broken (and how to fix it)," CSO, Oct. 3, 2019 https://www.csoonline.com/article/3025807/why-patching-is-still-a-problem-and-how-to-fix-it.html.

(Continued)

*Primary Examiner* — Tae K Kim
(74) *Attorney, Agent, or Firm* — Michael O'Keefe

(57) ABSTRACT

The subject matter herein provides an automated system and method for software patch management that ranks patches at least in part according to a score indicative of a complexity (e.g., cost) of remediating a vulnerability. This score is sometimes referred to herein as a vulnerability remediation complexity (VRC) score. A VRC score provides an objective measure by which an organization can determine which patches are most likely to be successfully applied, thus enabling implementation of a patching strategy that preferentially applies most critical, but less impact (in terms of remediation cost) patches first to remediate as must risk as possible as quickly as possible. Thus, for example, the approach herein enables the patching to focus on vulnerabilities of highest severity and small remediation cost over those, for example, representing lower severity and higher remediation cost.

22 Claims, 3 Drawing Sheets

(56) References Cited

U.S. PATENT DOCUMENTS

| | | | | |
|---|---|---|---|---|
| 2008/0276295 | A1* | 11/2008 | Nair | G06F 21/57 |
| | | | | 726/1 |
| 2011/0138374 | A1* | 6/2011 | Pal | G06F 8/656 |
| | | | | 717/169 |
| 2012/0185944 | A1* | 7/2012 | Abdine | G06F 21/577 |
| | | | | 726/25 |
| 2013/0185696 | A1 | 7/2013 | Farchi et al. | |
| 2013/0340074 | A1* | 12/2013 | Ayachitula | G06F 21/577 |
| | | | | 726/22 |
| 2014/0331277 | A1* | 11/2014 | Frascadore | G06F 21/577 |
| | | | | 726/1 |
| 2015/0019564 | A1* | 1/2015 | Higginson | G06F 8/65 |
| | | | | 707/748 |
| 2016/0103671 | A1 | 4/2016 | Curran et al. | |
| 2016/0103673 | A1* | 4/2016 | Curran | G06F 8/658 |
| | | | | 717/168 |
| 2016/0119373 | A1* | 4/2016 | Fausto | H04L 63/1433 |
| | | | | 726/25 |
| 2016/0259638 | A1* | 9/2016 | El Maghraoui | G06F 8/65 |
| 2016/0306618 | A1* | 10/2016 | Bansod | G06F 8/65 |
| 2017/0098087 | A1* | 4/2017 | Li | H04L 63/1416 |
| 2017/0364345 | A1* | 12/2017 | Fontoura | G06F 9/5072 |
| 2018/0011700 | A1* | 1/2018 | Plate | G06F 8/65 |
| 2018/0124072 | A1* | 5/2018 | Hamdi | G06F 11/3006 |
| 2018/0136921 | A1* | 5/2018 | Pfleger de Aguiar | G06Q 10/20 |
| 2018/0189497 | A1* | 7/2018 | Sukhomlinov | G06F 21/50 |
| 2019/0052662 | A1* | 2/2019 | Chiu | H04L 63/20 |
| 2020/0177615 | A1* | 6/2020 | Grabois | H04L 63/20 |
| 2020/0249928 | A1* | 8/2020 | Zeng | H04L 63/1433 |
| 2020/0356675 | A1* | 11/2020 | Shakarian | G06F 11/008 |

OTHER PUBLICATIONS

Sanders, "Rushing to patch? Here's how to prioritize your security efforts," TechRepublic, Jan. 22, 2019 https://www.techrepublic.com/article/rushing-to-patch-heres-how-to-prioritize-your-security-efforts/.

Reguly, "Understanding Prioritization—Patches and Vulnerabilities," Tripwire, May 9, 2016 https://www.tripwire.com/state-of-security/featured/understanding-prioritization/.

Tripwire, "Tripwire Vulnerability Scoring System," available Dec. 2019 https://www.tripwire.com/solutions/vulnerability-and-risk-management/tripwire-vulnerability-scoring-system-register/.

First, "Common Vulnerability Scoring System SIG," available Dec. 2019 https://www.first.org/cvss/.

Bloomberg, "To patch or not patch? Surprisingly, that is the question," available Dec. 2019 https://www.forbes.com/sites/jasonbloomberg/2018/04/16/to-patch-or-not-to-patch-surprisingly-that-is-the-question/#46d254e358fe.

IBM, "Remediation management: Prioritize and fix vulnerabilities that pose an imminent threat," IBM Security Services, 2019, https://www.ibm.com/downloads/cas/7WPEGNYP.

* cited by examiner

VULNERABILITY REMEDIATION COMPLEXITY (VRC) SYSTEM

BACKGROUND

Technical Field

This disclosure relates generally to protecting computing systems.

Background of the Related Art

Patch management is a strategy for managing patches or upgrades for software applications and technologies. A patch management plan can help a business or organization handle these changes efficiently. As is well-known, software patches are often necessary in order to fix existing problems with software that are noticed after an initial release. Many of these patches have to do with security. In an ideal world, a patch management strategy and supporting tools and techniques would ensure that all systems have the latest patches installed and applied. Existing approaches, however, do not meet this ideal and, accordingly, systems often become out-of-patch/update compliance. The reasons are several-fold. Applying patches interrupts operations, e.g., by requiring forced reboot, application restart, etc., which can be very disruptive. Moreover, vulnerabilities of course are not static, as new vulnerabilities continuously become known and patches created. This makes it difficult to keep up with necessary patch changes. A further problem is that there are often too many systems and software installations involved, e.g., server farms with thousands of servers, each with several applications, etc.) Patching in this type of environment can prove very challenging. Thus, it is a well-known problem that there are often numerous unpatched systems in organizations and in the wild.

There are several known techniques for determining which systems should be patched and in which order, however, none of the approaches look at the complexity of the remediation for a vulnerability. This latter point is important because typically an organization likely has several vulnerabilities to patch at any given time. The organization may rank the vulnerabilities (e.g., from high-to-low) and then logically begin by patching all the vulnerabilities that are flagged as being high. Unfortunately, however, not all "high" issues represent the same degree of risk, and some can be easily remediated with a simple software update and no reboot; others, however may require a series of steps—some of which may fail or otherwise leave the system vulnerable if not properly applied.

In view of this variability, it would be desirable to provide a system that can reduce the amount of risk organizations face when patching critical vulnerabilities and, in particular, to provide the organization with an ability to determine in advance which patches are most likely to be successfully applied. The technique of this disclosure provides this solution.

BRIEF SUMMARY

The subject matter herein provides an automated system and method for software patch management that ranks patches at least in part according to a score indicative of a complexity (e.g., cost) of remediating a vulnerability. This score is sometimes referred to herein as a vulnerability remediation complexity (VRC) score. A VRC score provides an objective measure by which an organization can determine which patches are most likely to be successfully applied, thus enabling implementation of a patching strategy that preferentially applies most critical, but less impact (in terms of remediation cost) patches first to remediate as must risk as possible as quickly as possible. Thus, for example, the approach herein enables the patching to focus on vulnerabilities of highest severity and small remediation cost over those, for example, representing lower severity and higher remediation cost.

In one aspect, a method of patch management in a computer network begins by receiving a set of patches for install in a set of computer systems in the computer network. For each of one or more patches in a set of patches, a score that quantifies a remediation cost of a patching operation to install the patch is computed. A priority order of applying the set of patches is then determined based at least in part on the scores. The set of patches are then applied to the set of computer systems according to the priority order. The priority order prioritizes for install at least one patch in the set of patches that is associated with a high severity vulnerability but that has a relatively-lower remediation cost (as determining by the scoring). The remediation cost of the patching operation typically is based on a set of factors, such as: a number of patches, a number of registry modifications, a number of system configuration changes, and a combination thereof. Other factors that may influence a particular score for a given patch to be installed include an impact to an availability of the computer system that is a target of the patching operation for the given patch, a criticality of the computer system that is a target of the patching operation for the given patch, historical data about whether a prior install of the given patch was successful, and the like. In one embodiment, the priority order for patching also is based at least in part on a vulnerability severity order for a set of vulnerabilities identified for patching by the set of patches.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
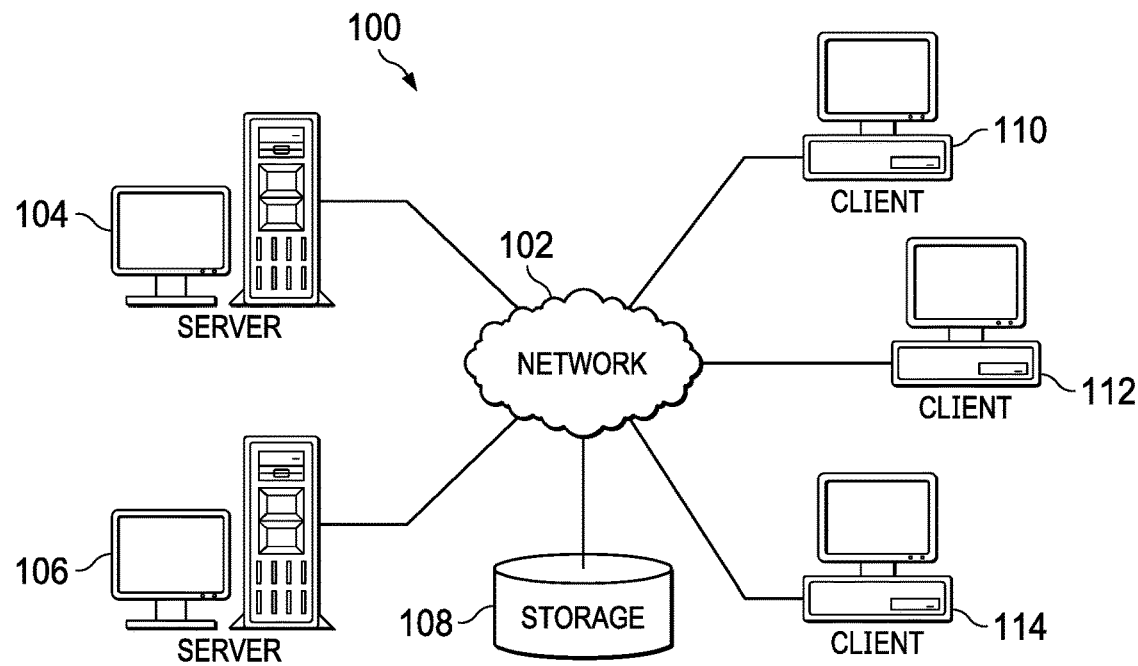
FIG. 1 depicts an exemplary block diagram of a distributed data processing environment in which exemplary aspects of the illustrative embodiments may be implemented.
Figure 2:
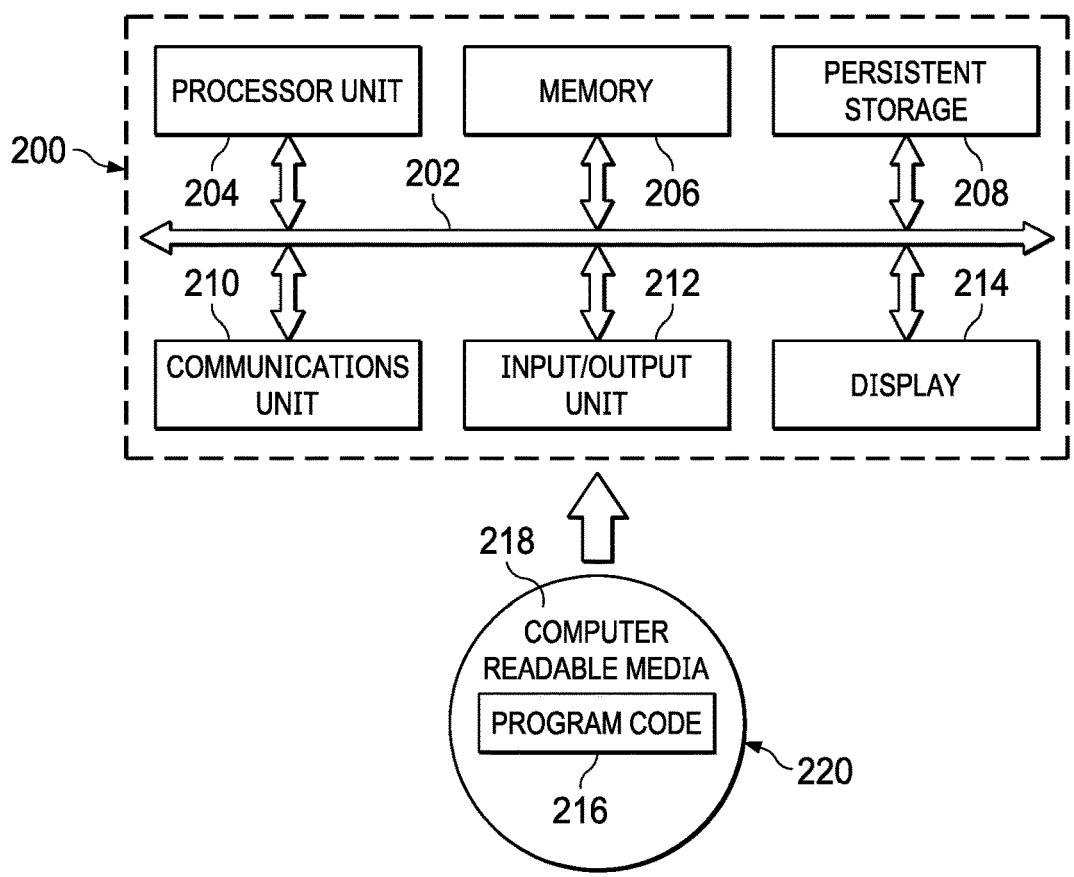
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the disclosed subject matter.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Patch Management in an Enterprise Computing Environment

As will be seen, the technique herein may be implemented in or in association with an endpoint management system operating within or in association with various types of computing infrastructures. For exemplary purposes only, one example is IBM® BigFix, which is a suite of products that provides a solution for compliance, endpoint, and security management and allows organizations to see and manage physical and virtual endpoints through a single infrastructure, a single console, and a single type of agent. This solution, which is identified herein for exemplary purposes and is not intended to be limiting, provides a multi-layered technology platform that acts as a core part of a global IT infrastructure. The platform is a dynamic, content-driven messaging and management system that distributes the work of managing IT infrastructures out to the managed devices themselves, the agents. The platform can manage up to hundreds of thousands of physical and virtual computers, over private or public networks, including servers, desktops, roaming laptops, mobile phones, point-of-sale devices, self-service kiosks and other network-connected machines. The platform supports various operating systems. In this approach, a single intelligent agent provides for continuous endpoint self-assessment and policy enforcement, real-time visibility and control from a single management console, management of thousands of endpoints regardless of location, connection type, or status, targeting of specific actions to an exact type of endpoint configuration or user type, management of complexity and cost reduction, increasing accuracy, and boosting productivity, patch management, software distribution, and operating system deployment, support for heterogeneous platforms, mobile device management, automatic endpoint assessment and vulnerability remediation, real-time protection from malware and other vulnerabilities, and server automation.

Figure 3:
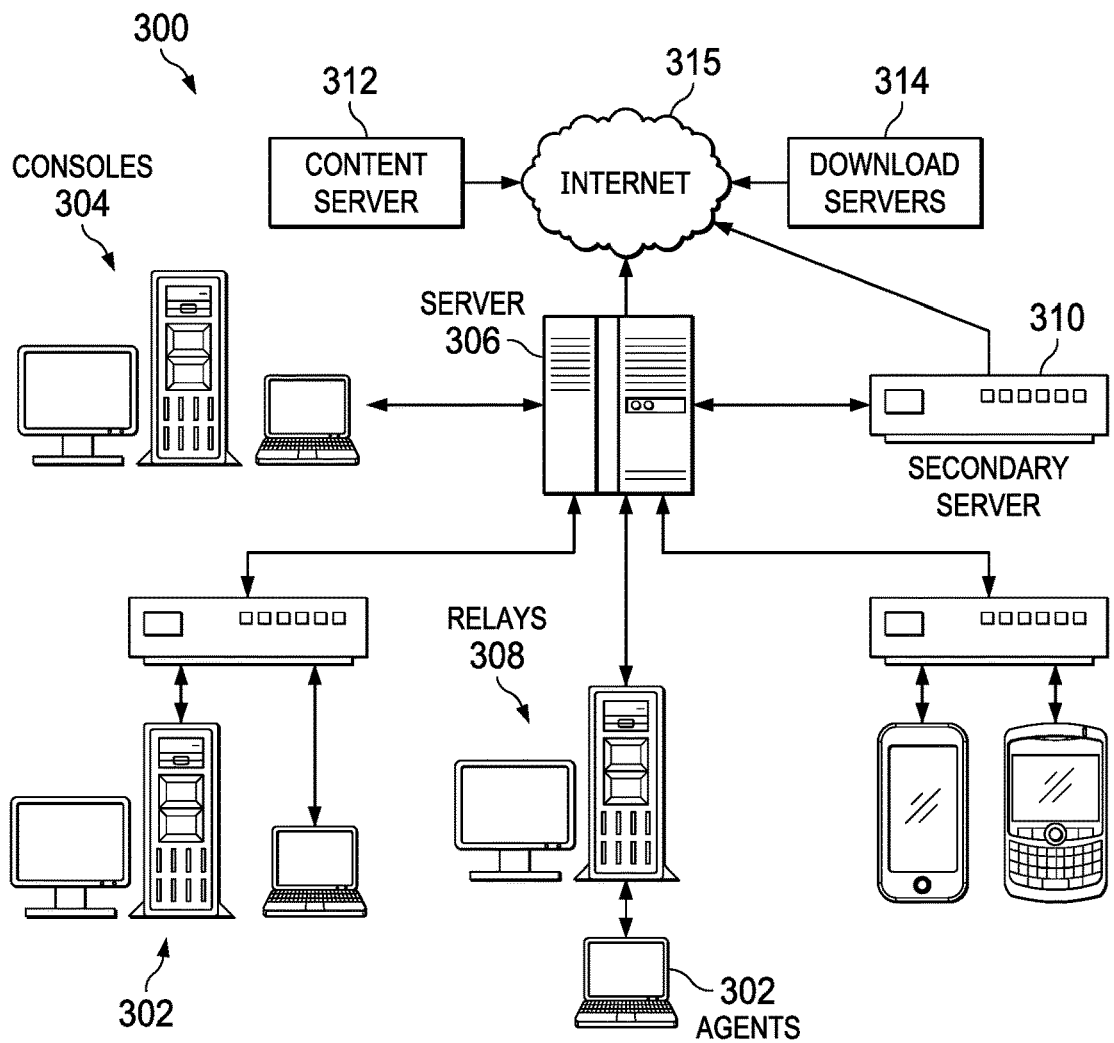
FIG. 3 depicts a representative endpoint management system that includes a patching system and in which the techniques of this disclosure may be implemented.

As depicted in FIG. 3, a solution 300 of this type comprises an intelligent agent 302, a console 304, a server 306, optionally one or more relays 308, and an optional secondary server 310. The intelligent agent 302 is a small piece of code that is installed on each computer to be managed. The agent continuously assesses the state of the endpoint against a stated policy, whether connected to the network or not. As soon as the agent notices that a target is out of compliance with a policy or checklist, it informs the server 306, runs a configured remediation task, and immediately notifies the server of the task status and result. In most cases, the agent operates silently, without any direct intervention from the user. A computer with the IBM BigFix agent installed is also referred to as a client. The console 304 is provided to manage the solution; thus, depending on the supported application, the console facilitates various functions such as endpoint protection, systems lifecycle management, software distribution, security configuration and vulnerability management, and so forth. An operator with the required privileges can quickly and easily distribute a fix to only those computers that need it, with no impact on the rest of the network. The server 306 coordinates the flow of information to and from individual clients and stores the results in a database. The server 306 manages policy-based content and allows the operator to maintain real-time visibility and control over all devices in the environment. Preferably, the content is delivered in messages that are updated continuously, e.g., using a content delivery cloud-based service 312. Because most of the analysis, processing, and enforcement work is done by the agent rather than the server, one server can support up thousands of endpoints. When necessary, high availability is enabled by employing multiple servers.

One or more relays may be implemented and facilitate a lightweight and robust architecture. A relay 308 is a client that is enhanced with a relay service, and it may be an existing computing system. It performs all client actions to protect the host computer, and in addition, delivers content 312 and software downloads 314 to child clients and relays, e.g., via the Internet 315. Instead of requiring every networked computer to directly access the server, relays can be used to offload much of the burden. Hundreds of clients can point to a relay for downloads, which in turn makes only a single request to the server. Relays can connect to other relays as well, further increasing efficiency. Promoting an agent to a relay does not require dedicated hardware or network configuration changes.

The secondary server 310 replicates the server information for disaster recovery. The console 304 supports web-based reporting by which the user can produce charts and graphs of data, maintain audit trials, and so forth. The interface runs in a web browser and provides a set of users with visibility into the state of the computers.

The agent(s) perform multiple functions including continuous self-assessment and policy enforcement, all with minimal system impact. The server and console are highly-secure, and highly-scalable, and they provide aggregated data, analysis and reporting, as well as the ability to push out to the endpoints pre-defined or custom policies. Existing systems can be used as relays and to provide built-in redundancy, as well as to support and secure roaming endpoints.

The solution comprises one or more applications that provide consolidated security and operations management, simplified and streamlined endpoint management, while increasing accuracy and productivity. These include, without limitation, lifecycle management (e.g., operating system deployment, power management, remote control, server automation, software distribution, etc.), automated patching to all distributed endpoints (patch tooling), automated remediation, inventory management, vulnerability protection, and the like. For automated patching, the system typically applies patches based on vulnerability severity order.

The above-described system is not intended to be limiting, as the technique herein may be implemented in or association with other types of enterprise systems.

Vulnerability Management Services

By way of further background, it is well-known that even just a single unpatched vulnerability can compromise an enterprise. Indeed, a significant percentage of the large number of known vulnerabilities have exploits associated with them. Thus, if those exploits are not prioritized and remediated, then the risk of a compromise elevates dramatically.

Accordingly, prioritization and remediation management are important components of an effective vulnerability management program. Ranking vulnerabilities provides organizations with an actionable understanding of which ones should be remediated first. It enables security leaders to focus their limited resources and time on vulnerabilities that, if exploited, would impact the business the most. When vulnerabilities are prioritized, quick and manageable risk-based remediation should follow.

Figure 4:
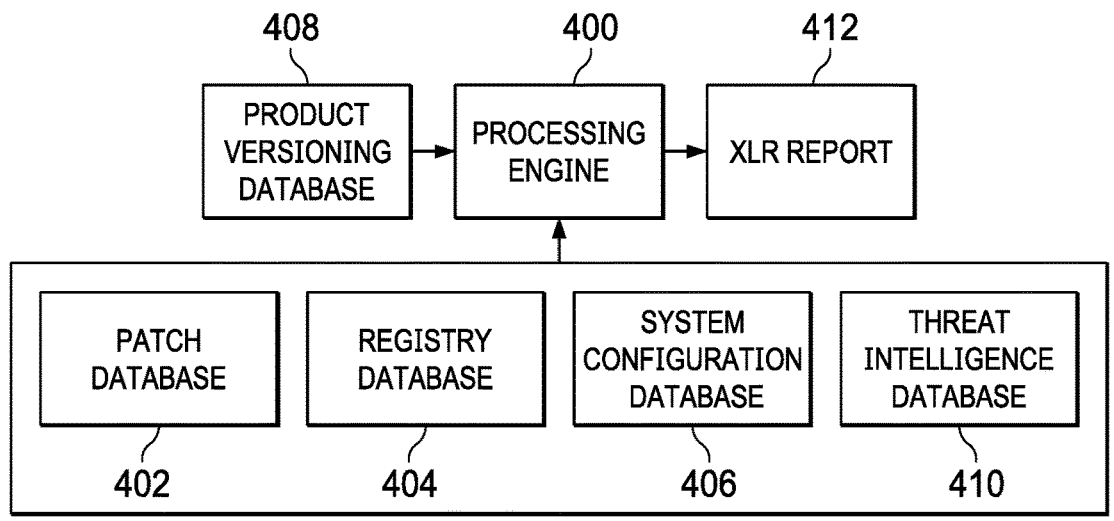
FIG. 4 depicts a vulnerability risk management service solution in which the techniques of this disclosure may be implemented.

Vulnerability prioritization and remediation management systems and services are known. One solution of this type is IBM® X-Force Red Vulnerability Management Services. The service may be implemented on a self-service or managed basis, e.g., using on-premises or cloud-based scanning tools and systems. For example, the service may be provisioned to access all or particular network scanners and their ticketing systems for prioritization and remediation. As depicted in FIG. 4, in one aspect a solution of this type provides a cloud-based processing engine 400 that correlates information from various sources to rank vulnerabilities, e.g., based on asset value and likelihood of being weaponized (e.g., based on information about active exploitation in the wild). The engine may be executed inside an enterprise when required by privacy standards. These data sources include an organization's asset databases (such as a patch database 402, a registry database 404, a configuration management databases (CMDBs) 406, a product version database 408, and the like, as well from threat intelligence data feeds, e.g., XFDB 410. XFDB refers to the IBM X-Force Vulnerability Database, which holds over 100,000 publicly-disclosed vulnerabilities. Using these inputs, vulnerabilities are automatically ranked and reported at XLR report 412, preferably as a pre-scan vulnerability ranking. As will be described below, and according to this disclosure as will be described, the report 412 preferably is augmented to also include complexity scoring, which scoring reflects a complexity of implementing a patch, where the complexity is a function of a cost (to the organization) of the remediation. The service also provides data validation, identifying, verifying and eliminating false positions so that only truly critical vulnerabilities remain on a priority list for remediation. When vulnerabilities are validated and ranked based on asset value and weaponization, the report 412 is a prioritized list of which vulnerabilities should be focused on first. In one embodiment, each vulnerability identified on the list includes a title, severity ranking, category, associated threat, proposed solution and remediation schedule. Vulnerabilities with a low CVSS (Common Vulnerability Scoring System) score may be at the top of the list for remediation if they affect a high-value asset and are being weaponized. The service may also provide concurrent remediation, e.g., by providing remediators with manageable lists of the most critical vulnerabilities to fix first, or by providing control information to automated patch management systems, such as described above with respect to FIG. 3.

The commercial solution described above is not intended to be implemented, as the technique herein may be practiced in any solution (native or cloud-based, or a hybrid thereof) that provides scanning, prioritizing and remediation management of vulnerabilities.

Vulnerability Remediation Complexity (VRC) System and Method

With the above as background, the technique of this disclosure is now described. As described generally above, the subject matter herein provides an automated system and method for software patch management that ranks patches at least in part according to a score indicative of a complexity (e.g., cost) of remediating a vulnerability. This score is sometimes referred to herein as a vulnerability remediation complexity (VRC) score. This nomenclature is not intended to be limiting. As will be seen, a VRC score as described herein provides an objective measure by which an organization can determine which patches are most likely to be successfully applied, thus enabling implementation of a patching strategy that preferentially applies most critical, but less impact (in terms of remediation cost) patches first to remediate as must risk as possible as quickly as possible. Thus, for example, the approach herein enables the patching to focus on vulnerabilities of highest severity and small remediation cost over those, for example, representing lower severity and higher remediation cost.

In one aspect, the technique herein involves determines the "complexity" of a patch, with the notion of complexity being based on a set of one or more factors required to apply the patch. Preferably, and as will be described, the complexity is a "score" that is computed by taking the various factors into consideration. Patch complexity (sometimes referred to herein simply as "a patch risk") is then used at least in part to determine a priority patch order, typically by adjusting a patch ordering that is otherwise based simply on vulnerability severity. By addressing complexity, patch management and remediation take into consideration an overall security risk of the vulnerability being patched. Preferably, the system applies the least risk patches (in terms of complexity) with the highest vulnerability scores in order. When used in association with an automated patch management system such as described above, this information is provided to patch tooling to allow for an automated prioritized order of patching. The information is also useful to ensure that patch tooling performs all required steps to patch a vulnerability. As a further extension, complexity-based scoring approach herein is coupled with a system to learn based on the actual application of the patch versus the predicated complexity of the patch, thereby enabling continuous improvement of the underlying patch management system.

Preferably, a vulnerability remediation complexity (VRC) risk score is based on at least a set of remediation cost data. The remediation cost data may vary based on implementation, but typically remediation cost comprises, for a particular vulnerability, a set of data that includes one or more of the following: a number of patches, a number of registry modifications, a number of system configuration changes, various combinations of such data, or the like. The remediation cost thus identifies (and provides a way to quantify) the potential impact to the enterprise of undertaking the remediation for a particular vulnerability. The remediation cost may also be influenced on an intervention likelihood, e.g., the nature and type of intervention (or not) that may be required for patching, for changes to the registry, for changes to the system configuration, etc. In addition to remediation cost, which cost typically is a baseline metric for the VRC computation, the VRC computation may also be informed by (i.e. based on) additional data, which are sometimes referred to herein as score amplifiers. A score amplifier typically provides an indicator regarding availability impact, such as whether applying the patch requires a reboot, or an application restart, or a service or network restart. One or more of these impacts would tend to increase the VRC, represented by a higher score (more complexity). In addition to the score amplifier(s), the VRC computation may use other information if available to the scoring system, such as historical data. Historical data of this type includes, for example, log data indicating successfully applied and tested patches, historical cost score accuracy (from prior predictions in the system), historical available impact accuracy (from prior predictions in the system), and the like. Still additional factors (information) that may go into the VRC computation include the nature and type of the system being patched (system criticality), the nature and type of accessibility of the system being patched (e.g., is the system accessible over the web, thereby indicating more risk, etc.), the nature and type of data supported in a system being patched (e.g., is PII or PHI data stored in the system, etc.), and the like. Other factors that may be used to influence a VRC include temporal data, such as the time(s) that are necessary to complete a task or subtask during a vulnerability remediation. These time-based impacts may be used to alter the VRC scoring.

Typically, vulnerabilities identified by a vulnerability management system conform to a number of high-level (coarse) categories, such as "critical" or "highest," "medium" or "low." According to this disclosure, a set of vulnerabilities within each such high-level category or grouping are those that have been identified for patching, and the VRC score(s) for the set are then applied to determine whether the sequencing of applying those patches should then be changed. This sequencing—which takes the VRC scoring into consideration—then provides a technique that provides for more fine-grained priority patch ordering, an ordering that takes the VRC into consideration. In this manner, VRC scoring is used rank (or more typically re-rank) one or more vulnerabilities within a grouping, such that vulnerabilities of highest severity and small remediation cost are prioritized. This enables an organization to remediate as much risk as possible as quickly as possible.

Figure 5:
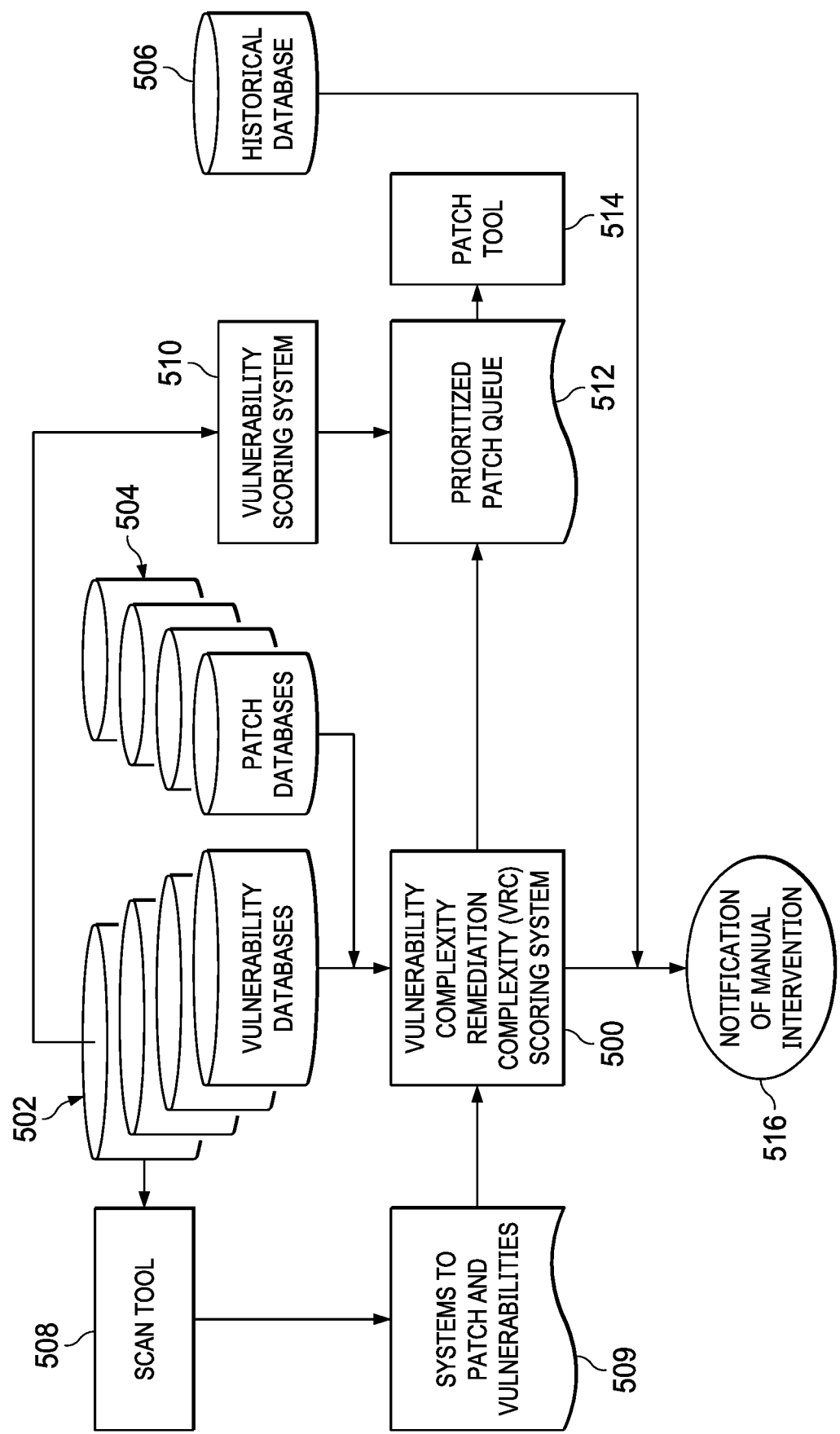
FIG. 5 depicts a representative workflow of a risk management system that includes a vulnerability remediation complexity (VRC) scoring system of this disclosure.

According FIG. 5 depicts a representative workflow of an enterprise computing system that implements vulnerability remediation scoring. The computation described above is implemented in a vulnerability remediation complexity (VRC) scoring system 500, which typically is a computing system, machine, application, process or program. A representative implementation is a computer program, namely, a set of computer program instructions, executed in one or more processors. The VRC scoring system 500 receives inputs from various sources, namely, vulnerability databases 502 (e.g., CVSS, XFDB, etc.), patch databases 504, historical databases 506, and an identification of systems 509 to patch and identified vulnerabilities sourced from scanning tools 508. Scanning tools 508 may be on-premises or cloud-based, e.g., Qualys®. The various elements may comprise part of or interoperate with a vulnerability management service, as previously described. The information supplied from the vulnerability databases 504 may also be input to a separate vulnerability scoring system 510. The particular criteria by which the vulnerabilities themselves are scored relative to one another is an element of this disclosure, but it is assumed that the vulnerability scoring system 510 outputs vulnerability severity data according to some criteria such that the vulnerabilities in the grouping have a default ordering/priority for patching (based on those severities). This vulnerability severity order, however, does not take patch complexity (as defined herein) into consideration.

The VRC scoring system 500 outputs the VRCs, which as noted above quantify the cost of remediation, and these VRC risk scores are then used to adjust (or augment) how the patching system then determines what vulnerabilities to address and in what order. Typically, the VRC scoring adjusts the vulnerability severity order (provided by system 510), although this is not a requirement. To this end, and as depicted, the VRC scoring system 500 output (namely, the VRC scores) are provided to prioritize one or more patches in a patch queue 512. The patches in the patch queue address vulnerabilities that have been identified for patching (by other systems), and in effect these vulnerabilities are scored by both the vulnerability scoring system 510 (for severity), as well as by the VRC scoring system 500 (for remediation complexity). According to this disclosure, the VRC scoring augments the vulnerability scoring, typically resulting in adjusting the patch order by prioritizing at least one high severity vulnerability with smaller remediation cost (lower VRC) over a similar high severity vulnerability with higher remediation cost (higher VRC) or other lower severity or high remediation cost patches. Generalizing, the system applies the least risk patches (in terms of complexity) with the highest vulnerability scores in order. Depending on their value(s), there may of course be circumstances when the VRC computations do not impact patch implementation priority, but typically the inclusion of the VRC does alter this priority.

As also depicted in FIG. 5, the patches are then applied by a patch tool 514. The patch tool (or tooling) typically is a patch management system that provides for automated patching of the computer systems that are targeted for the patch operations. Automated patch tooling may be stand-alone systems of components of larger endpoint management systems, such as described above and depicted in FIG. 3. The particular nature of the patch tooling system is not a component of this disclosure, as such systems, devices, products and processes are known.

As also shown, the output of the VRC scoring system may also be applied to other systems, e.g., for alerting, monitoring, logging, and the like. In this example, the alerting system provides for a notification of manual intervention 516 with respect to a particular installation for a patch. The nature and type of interactions with such other systems will be implementation-dependent.

The inclusion of the VRC computation in managing patching as described herein provides a way for an organization to know which patches are most likely to be successfully applied. Using the approach herein, and given vulnerabilities within a grouping that must be patched, preferably lower-complexity remediation efforts are prioritized over higher-complexity efforts. As noted, this approach enables the organization to remediate as much risk as possible, as quickly as possible.

A VRC may be computed for the patch as a whole, but this is not a requirement. In a variant embodiment, each of a set of tasks that must be implemented to address a vulnerability may be scored separately, with each task then provided its own VRC. In this variant, the VRC scores may then be used to prioritize the tasks themselves provided that the tasks themselves are sufficiently independent of one another such that their sequence is capable of being re-prioritized.

A vulnerability risk management service that implements VRC risk scoring may provide a pre-scan vulnerability ranking and complexity score for a piece of software and its associated vulnerabilities. This information allows for easy viewing and processing of high-risk vectors within a given network in which that software is installed (or to be installed). Thus, for example, the information presented may include: software name and version, a count of CVEs identified to the named software, a count of exploits for the named software, the VRC score herein, a CVSS median score, a CVSS severity ranking, a highest CVSS score found in collection of identified CVEs (Common Vulnerability Enumerations), other scores (e.g., a count of Qualys® identifiers), etc. The VRC in particular may then provide additional details, namely: number of patches/systems, number of registry changes, number of configuration changes needed to fix, etc. A report of this type enables the user to quickly identify real world examples of exploits of each software and the risk they present to the user's network.

The following describes an example use case. Consider a vulnerability such as MS15-011, which is a known Microsoft® remote code execution vulnerability in how the group policy receives and applies connection data when a domain-joined system connects to a domain controller. It is assumed that the patch management system applies patch code, but for this particular vulnerability the patches do not take effect until additional steps are performed (in this case a registry edit). Thus, even after the patch is applied, scan tools continue to detect the vulnerability. Using the technique of this disclosure, the VRC scoring also is provided to the patch tooling as depicted in FIG. 3 to ensure that all the appropriate steps are completed. At a minimum, patches with manual intervention are then flagged and notifications (that registry editing is still required) are sent. As this example shows, the remediation cost determination facilitates providing a feedback loop to ensure that the tooling performs all required steps to patch a vulnerability.

The technique has numerous advantages. It addresses the problem of patching code in a production environment with the goal of reducing the most amount of risk as quickly as possible while also reducing business impact. As described, the approach preferably examines the complexity of the patch and the impact to systems, and it prioritizes the patches (or batches thereof) based on lowest impact to the business and highest potential risk the software in question is not patched. This approach helps organizations reduce risk much faster than previous patch strategies while not increasing overall downtown risk to the business.

Stated another way, the technique as described looks at risks associated with security or overall security risk based on patch complexity. Preferably, the approach herein addresses the problem with patching the highest risk vulnerabilities first that have the least risk of failure/impact to systems. In this way, the approach significantly reduces the overall security risk to the organization, namely, by applying the most likely to succeed patches with minimal downtime that would otherwise have the largest impact in an organization's security risk. In the technique, the least complex patches that patch the highest risk vulnerabilities preferably are patched first, thereby reducing the organization's security risk profile. The technique advantageously looks at security risk and complexity to apply individual patches as inputs to prioritization. This information is also useful as a check to ensure that the tooling performs all required steps to patch a vulnerability.

A further advantage of the VRC scoring system is that both the information generated and the patch management plans implemented based on that risk scoring can be monitored and evaluated to determine how much business risk they ameliorate. VRC scoring (or patch priorities based thereon) are readily evaluated, e.g., using deep learning, to improve operations of the VRC scoring engine or systems that use patch complexity scoring according to the techniques herein. Thus, preferably the system tracks computed VRCs and evaluates their accuracy, e.g., by recording actual remediation activities and then determining whether that VRC scoring provided an accurate prediction of remediation cost(s), thereby enabling the VRC scoring to continually improve.

As used herein, a vulnerability remediation complexity (VRC) risk score may be absolute or relative, and it may be characterized by a number, a percentage, or the like. A particular VRC may also be associated with a confidence value or level (e.g., high), as well as information detailing how the VRC was computed (e.g., the number of patches, the number of registry modifications, the number of system configuration changes, what availability impact(s) were specified or considered, what historical data was specified or considered, etc.). For any particular vulnerability that needs remediation, an appropriate VRC is computed and output either to a remediator (for manual remediation) or to a patch tooling system (for automated remediation) to facilitate the patch remediation sequencing. As a particular VRC approaches some defined value (e.g. a configurable threshold), the system may then be controlled automatically to implement a given remediation or mitigation operation. Typically, vulnerabilities are classified by type or sub-type, and there may be a single VRC score associated with all vulnerabilities within a specified type or sub-type, although preferably a VRC is associated to each vulnerability or, more generally, to each remediation task associated with remediating a vulnerability.

Typically, there is a scoring model per vulnerability type, but this is not required.

This VRC scoring subject matter herein may be implemented in whole or in part as-a-service. The subject matter may be implemented within or in association with a data center that provides cloud-based computing, data storage or related services. As also described, the VRC scoring engine may operate in association with a learning system (e.g., a deep neural network (DNN)) used to enhance predictions.

In a typical use case, a vulnerability management system or other security system is associated with an interface that can be used to render or provide other output that the VRC (or the pre-scan vulnerability ranking report that includes the VRC) presents visually, allows for searching and retrieval of relevant information from a vulnerability database, and performs other patch management functions with respect thereto. When the VRC scoring system is used with automated patch tooling, the VRC scores (and priority order) are provided to the automated patch tooling via an application programming interface (API) or other request-response interaction.

The functionality described in this disclosure may be implemented in whole or in part as a standalone approach, e.g., a software-based function executed by a hardware processor, or it may be available as a managed service (including as a web service via a SOAP/XML/JSON interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the vulnerability remediation complexity (VRC) scoring system and related techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., patch management systems, patch tooling, vulnerability management systems, security incident and event management (SIEM) systems, other security systems, as well as improvements to automation-based cybersecurity analytics.

Having described the invention, what we claim is as follows.

The invention claimed is:

1. A method of patch management in a computer network, comprising:
   receiving a set of patches for install in a set of computer systems in the computer network, the set of patches for install having been identified for a set of vulnerabilities identified for patching, the set of vulnerabilities having a vulnerability severity order, wherein the vulnerability severity order is a default, prioritized list of which vulnerability to patch first based on a value of an impacted asset and a weaponization metric associated with a particular vulnerability;
   for each of one or more patches in the set of patches for install, computing a score that quantifies a complexity measure indicating a likelihood that the patch is applied successfully, the complexity measure including a remediation cost of a patching operation to install the patch, and additional data;
   determining a priority order of applying the set of patches for install based at least in part on the scores, the priority order prioritizing least complex patches, as indicated by their complexity measures, that patch highest risk vulnerabilities, as indicated by their vulnerability severity order;
   installing the set of patches to the set of computer systems according to the priority order; and
   using a feedback loop to ensure that all steps required to install the set of patches are completed.

2. The method as described in claim 1 wherein the priority order prioritizes for install at least one patch in the set of patches that is associated with a high severity vulnerability but that has a low remediation cost over a similar high severity vulnerability with higher remediation cost.

3. The method as described in claim 1 wherein the remediation cost of the patching operation to install the patch is at least one of: a number of registry modifications, a number of system configuration changes, and a combination thereof.

4. The method as described in claim 1 further including determining the vulnerability severity order for the set of vulnerabilities identified for patching by the set of patches.

5. The method as described in claim 1 wherein the additional data is an impact to an availability of the computer system that is a target of the patching operation for the given patch.

6. The method as described in claim 1 wherein the additional data is a criticality of the computer system that is a target of the patching operation for the given patch.

7. The method as described in claim 1 wherein the additional data is a patch application history.

8. An apparatus, comprising:
   a processor;
   computer memory holding computer program instructions executed by the processor for patch management in a computer network, the computer program instructions configured to:
      receive a set of patches for install in a set of computer systems in the computer network, the set of patches for install having been identified for a set of vulnerabilities identified for patching, the set of vulnerabilities having a vulnerability severity order, wherein the vulnerability severity order is a default, prioritized list of which vulnerability to patch first based on a value of an impacted asset and a weaponization metric associated with a particular vulnerability;
      for each of one or more patches in the set of patches for install, compute a score that quantifies a complexity measure indicating a likelihood that the patch is applied successfully, the complexity measure including a remediation cost of a patching operation to install the patch, and additional data;
      determine a priority order of applying the set of patches for install based at least in part on the scores, the priority order prioritizing least complex patches, as indicated by their complexity measures, that patch highest risk vulnerabilities, as indicated by their vulnerability severity order;
      install the set of patches to the set of computer systems according to the priority order; and
      use a feedback loop to ensure that all steps required to install the set of patches are completed.

9. The apparatus as described in claim 8 wherein the priority order prioritizes for install at least one patch in the set of patches that is associated with a high severity vulnerability but that has a low remediation cost over a similar high severity vulnerability with higher remediation cost.

10. The apparatus as described in claim 8 wherein the remediation cost of the patching operation to install the patch is at least one of: a number of registry modifications, a number of system configuration changes, and a combination thereof.

11. The apparatus as described in claim 8 wherein the computer program instructions are further configured to determine the vulnerability severity order for the set of vulnerabilities identified for patching by the set of patches.

12. The apparatus as described in claim 8 wherein the additional data is an impact to an availability of the computer system that is a target of the patching operation for the given patch.

13. The apparatus as described in claim 8 wherein the additional data is a criticality of the computer system that is a target of the patching operation for the given patch.

14. The apparatus as described in claim 8 wherein the additional data is a patch application history.

15. A computer program product in a non-transitory computer readable medium for use in a data processing system for patch management in a computer network, the computer program product holding computer program instructions that, when executed by the data processing system, are configured to:

receive a set of patches for install in a set of computer systems in the computer network, the set of patches having been identified for a set of vulnerabilities identified for patching, the set of vulnerabilities having a vulnerability severity order, wherein the vulnerability severity order is a default, prioritized list of which vulnerability to patch first based on a value of an impacted asset and a weaponization metric associated with a particular vulnerability;

for each of one or more patches in the set of patches for install, compute a score that quantifies a complexity measure indicating a likelihood that the patch is applied successfully, the complexity measure including a remediation cost of a patching operation to install the patch, and additional data;

determine a priority order of applying the set of patches for install based at least in part on the scores, the priority order prioritizing least complex patches, as indicated by their complexity measures, that patch highest risk vulnerabilities, as indicated by their vulnerability severity order;

install the set of patches to the set of computer systems according to the priority order; and use a feedback loop to ensure that all steps required to install the set of patches are completed.

16. The computer program product as described in claim 15 wherein the priority order prioritizes for install at least one patch in the set of patches that is associated with a high severity vulnerability but that has a low remediation cost over a similar high severity vulnerability with higher remediation cost.

17. The computer program product as described in claim 15 wherein the remediation cost of the patching operation to install the patch is at least one of: a number of registry modifications, a number of system configuration changes, and a combination thereof.

18. The computer program product as described in claim 15 wherein the computer program instructions are further configured to determine the vulnerability severity order for the set of vulnerabilities identified for patching by the set of patches.

19. The computer program product as described in claim 15 wherein the additional data is an impact to an availability of the computer system that is a target of the patching operation for the given patch.

20. The computer program product as described in claim 15 wherein the remediation cost for a given patch is determined at least in part by a criticality of the computer system that is a target of the patching operation for the given patch.

21. The computer program product as described in claim 15 wherein the additional data is a patch application history.

22. A patching system for a computer network, comprising:

at least one hardware processor;

a data store holding a set of patches, the set of patches having an associated vulnerability severity order, wherein the vulnerability severity order is a default, prioritized list of which vulnerability to patch first based on a value of an impacted asset and a weaponization metric associated with a particular vulnerability; and computer memory storing computer program instructions configured as a vulnerability scoring system, the vulnerability scoring system configured to:

compute a vulnerability remediation complexity (VRC) score for one or more patches in the set of patches, the VRC score providing a complexity measure indicating a likelihood that the patch is applied successfully;

adjust the vulnerability severity order based at least in part on the computed VRC score for the one or more patches;

output to patch tooling the adjusted vulnerability severity order, wherein the adjusted vulnerability severity order prioritizes for install at least one patch in the set of patches that is associated with a high severity vulnerability but that has a low remediation cost as reflected by the VRC score over a similar high severity vulnerability with higher remediation cost;

control the patch tooling to install the set of patches; and use a feedback loop to ensure that all steps required to install the set of patches are completed.

* * * * *